US010565692B1

(12) United States Patent
Shen et al.

(10) Patent No.: US 10,565,692 B1
(45) Date of Patent: Feb. 18, 2020

(54) MOTION DEBLURRING USING NEURAL NETWORK ARCHITECTURES

(71) Applicant: Inception Institute of Artificial Intelligence, Ltd., Abu Dhabi (AE)

(72) Inventors: Jianbing Shen, Abu Dhabi (AE); Ziyi Shen, Abu Dhabi (AE); Wenguan Wang, Abu Dhabi (AE); Xiankai Lu, Abu Dhabi (AE); Ling Shao, Abu Dhabi (AE)

(73) Assignee: INCEPTION INSTITUTE OF ARTIFICIAL INTELLIGENCE, LTD., Al Maryah Island (AE)

( * ) Notice: Subject to any disclaimer, the term of this patent is extended or adjusted under 35 U.S.C. 154(b) by 0 days.

(21) Appl. No.: 16/567,856

(22) Filed: Sep. 11, 2019

(51) Int. Cl.
*G06T 5/00* (2006.01)
*G06N 3/04* (2006.01)
*G06N 3/08* (2006.01)

(52) U.S. Cl.
CPC ........... *G06T 5/003* (2013.01); *G06N 3/0454* (2013.01); *G06N 3/08* (2013.01); *G06T 2207/20084* (2013.01)

(58) Field of Classification Search
CPC .......... G06T 5/003; G06T 2207/20084; G06N 3/0454; G06N 3/08
See application file for complete search history.

(56) References Cited

U.S. PATENT DOCUMENTS

| 10,140,557 | B1* | 11/2018 | Prokopenya | ............. G06K 9/66 |
| 10,387,765 | B2* | 8/2019 | Mailhe | .................... G06T 5/001 |
| 10,424,087 | B2* | 9/2019 | Risser | ................... G06T 11/001 |
| 2017/0372193 | A1* | 12/2017 | Mailhe | ................. G06N 3/0472 |

OTHER PUBLICATIONS

M. Abadi, P. Barham, J. Chen, Z. Chen, A. Davis, J. Dean, M. Devin, S. Ghemawat, G. Irving, M. Isard, et al. Tensorflow: a system for large-scale machine learning. In OSDI, 2016.
D. Bahdanau, K. Cho, and Y. Bengio. Neural machine translation by jointly learning to align and translate. In ICLR, 2015.
Z. Bylinskii, A. Recasens, A. Borji, A. Oliva, A. Torralba, and F. Durand. Where should saliency models look next? In ECCV, 2016.

(Continued)

*Primary Examiner* — Ping Y Hsieh
(74) *Attorney, Agent, or Firm* — Bryan Cave Leighton Paisner LLP

(57) ABSTRACT

This disclosure relates to improved techniques for performing computer vision functions including motion deblurring functions. The techniques described herein utilize a neural network architecture to perform these functions. The neural network architecture can include a human-aware attention model that is able to distinguish between foreground human objects and background portions of degraded images affected by motion blur. The neural network architecture further includes an encoder-decoder network that separately performs motion deblurring functions on foreground and background portions of degraded images, and reconstructs enhanced images corresponding to the degraded images.

20 Claims, 7 Drawing Sheets
(3 of 7 Drawing Sheet(s) Filed in Color)

(56) References Cited

OTHER PUBLICATIONS

C. Cao, X. Liu, Y. Yang, Y. Yu, J. Wang, Z. Wang, Y. Huang, L. Wang, C. Huang, W. Xu, et al. Look and think twice: Capturing top-down visual attention with feedback convolutional neural networks. In ICCV, 2015.
S. Cho and S. Lee. Fast motion deblurring. ACM TOG (Proceedings of SIGGRAPH Asia), 28(5):145:1-145:8, 2009.
C. Dong, C. C. Loy, K. He, and X. Tang. Learning a deep convolutional network for image super-resolution. In ECCV, 2014.
M. Everingham, L. Van Gool, C. K. Williams, J. Winn, and A. Zisserman. The pascal visual object classes (voc) challenge. IJCV, 88(2):303-338, 2010.
H.-S. Fang, S. Xie, Y.-W. Tai, and C. Lu. Rmpe: Regional multi-person pose estimation. In ICCV, 2017.
R. Fergus, B. Singh, A. Hertzmann, S. T. Roweis, and W. T. Freeman. Removing camera shake from a single photograph. ACM TOG (Proceedings of SIGGRAPH), pp. 787-794, 2006.
D. Gong, J. Yang, L. Liu, Y. Zhang, I. D. Reid, C. Shen, A. Van Den Hengel, and Q. Shi. From motion blur to motion flow: A deep learning solution for removing heterogeneous motion blur. In CVPR, 2017.
A. Gupta, N. Joshi, C. L. Zitnick, M. Cohen, and B. Curless. Single image deblurring using motion density functions. In ECCV, 2010. 3.
S. Harmeling, H. Michael, and B. Scholkopf. Space-variant single-image blind deconvolution for removing camera shake. In NIPS, 2010.
K. He, X. Zhang, S. Ren, and J. Sun. Deep residual learning for image recognition. In CVPR, 2016.
M. Hirsch, C. J. Schuler, S. Harmeling, and B. Scholkopf. Fast removal of non-uniform camera shake. 2011.
M. Hradis, J. Kotera, P. Zemci'k, and F. Sroubek. Convolutional neural networks for direct text deblurring. In BMVC, 2015.
N. Joshi, R. Szeliski, and D. J. Kriegman. PSF estimation using sharp edge prediction. In CVPR, 2008.
J. Kim, J. K. Lee, and K. M. Lee. Accurate image super-resolution using very deep convolutional networks. In CVPR, 2016.
J. Kim, J. K. Lee, and K. M. Lee. Deeply-recursive convolutional network for image super-resolution. In CVPR, 2016.
T. H. Kim, B. Ahn, and K. M. Lee. Dynamic scene deblurring. In ICCV, 2013.
T. H. Kim and K. M. Lee. Segmentation-free dynamic scene deblurring. In CVPR, 2014.
D. P. Kingma and J. Ba. Adam: A method for stochastic optimization. arXiv preprint arXiv:1412.6980, 2014.
R. Kohler, M. Hirsch, B. Mohler, B. Scholkopf, and S. Harmeling. Recording and playback of camera shake: Benchmarking blind deconvolution with a real-world database. In ECCV, 2012.
D. Krishnan, T. Tay, and R. Fergus. Blind deconvolution using a normalized sparsity measure. In CVPR, 2011.
O. Kupyn, V. Budzan, M. Mykhailych, D. Mishkin, and J. Matas. Deblurgan: Blind motion deblurring using conditional adversarial networks. In CVPR, 2018.
W.-S. Lai, J.-J. Ding, Y.-Y. Lin, and Y.-Y. Chuang. Blur kernel estimation using normalized color-line prior. In CVPR, 2015.
W.-S. Lai, J.-B. Huang, N. Ahuja, and M.-H. Yang. Fast and accurate image super-resolution with deep laplacian pyramid networks. CVPR, 2017.
X. Mao, C. Shen, and Y.-B. Yang. Image restoration using very deep convolutional encoder-decoder networks with symmetric skip connections. In NIPS, 2016.
T. Michaeli and M. Irani. Blind deblurring using internal patch recurrence. In ECCV, 2014.
S. Nah, T. H. Kim, and K. M. Lee. Deep multi-scale convolutional neural network for dynamic scene deblurring. In CVPR, 2017.
M. Noroozi, P. Chandramouli, and P. Favaro. Motion deblurring in the wild. In GCPR, 2017.
J. Pan, Z. Hu, Z. Su, H.-Y. Lee, and M.-H. Yang. Soft-segmentation guided object motion deblurring. In CVPR, 2016.
J. Pan, D. Sun, H. Pfister, and M. Yang. Blind image deblurring using dark channel prior. In CVPR, 2016.
Q. Shan, J. Jia, and A. Agarwala. High-quality motion deblurring from a single image. ACM TOG (Proceedings of SIGGRAPH), 27(3):73:1-73:10, 2008.
Z. Shen, W.-S. Lai, T. Xu, J. Kautz, and M.-H. Yang. Deep semantic face deblurring. CVPR, 2018.
J. Shi, L. Xu, and J. Jia. Discriminative blur detection features. In CVPR, 2014.
J. Sun, W. Cao, Z. Xu, and J. Ponce. Learning a convolutional neural network for non-uniform motion blur removal. In CVPR, 2015.
L. Sun, S. Cho, J. Wang, and J. Hays. Edge-based blur kernel estimation using patch priors. In ICCP, 2013.
X. Tao, H. Gao, X. Shen, J. Wang, and J. Jia. Scale-recurrent network for deep image deblurring. In CVPR, 2018.
F. Wang, M. Jiang, C. Qian, S. Yang, C. Li, H. Zhang, X. Wang, and X. Tang. Residual attention network for image classification in CVPR, 2017.
Z. Wang, D. Liu, J. Yang, W. Han, and T. Huang. Deep networks for image super-resolution with sparse prior. In CVPR, 2015.
O. Whyte, J. Sivic, A. Zisserman, and J. Ponce. Non-uniform deblurring for shaken images. IJCV, 98(2):168-186, 2012.
P. Wieschollek, M. Hirsch, B. Scholkopf, and H. P. Lensch. Learning blind motion deblurring. In ICCV, 2017.
K. Xu, J. Ba, R. Kiros, K. Cho, A. Courville, R. Salakhudinov, R. Zemel, and Y. Bengio. Show, attend and tell: Neural image caption generation with visual attention. In ICML, 2015.
L. Xu and J. Jia. Two-phase kernel estimation for robust motion deblurring. In ECCV, 2010.
L. Xu, S. Zheng, and J. Jia. Unnatural L0 sparse representation for natural image deblurring. In CVPR, 2013. 3.
X. Xu, J. Pan, Y. Zhang, and M. Yang. Motion blur kernel estimation via deep learning. TIP, 27(1):194-205, 2018.
W. Yang, R. T. Tan, J. Feng, J. Liu, Z. Guo, and S. Yan. Deep joint rain detection and removal from a single image. In CVPR, 2017.
Z. Yang, X. He, J. Gao, L. Deng, and A. Smola. Stacked attention networks for image question answering. In CVPR, 2016.
J. Zhang, J. Pan, J. Ren, Y. Song, L. Bao, R. W. Lau, and M.-H. Yang. Dynamic scene deblurring using spatially variant recurrent neural networks. In CVPR, 2018. 3.
K. Zhang, W. Zuo, Y. Chen, D. Meng, and L. Zhang. Beyond a gaussian denoiser: Residual learning of deep cnn for image denoising. TIP, 26(7):3142-3155, 2017.

\* cited by examiner

MOTION DEBLURRING USING NEURAL NETWORK ARCHITECTURES

TECHNICAL FIELD

This disclosure is related to improved techniques for performing computer vision functions and, more particularly, to techniques that utilize trained neural networks and artificial intelligence (AI) algorithms to execute motion deblurring operations on blurry images.

BACKGROUND

Generally speaking, image deblurring refers to operations associated with recovering a sharp latent image with significant details from a degraded or blurry image. A variety of factors can contribute to blurring or degradation of images captured by an image capturing devices (e.g., camera). One significant factor that contributes to image blurring relates to the movement objects (e.g., humans, animals, vehicles, and/or other objects) relative to a sensor in the image capturing device when an image is being captured (e.g., when the shutter of the image capturing device is open). Blurring can be caused by either, or both of, the movement of the objects and the movement of the image capturing device.

When a scene is captured in an image, the scene can include both a foreground portion (e.g., which may include humans and/or objects located closer to the image capturing device) and a background portion (e.g., which may include human, objects, and/or scenery located further away from the image capturing device). Notably, the foreground portions and background portions of the scene often experience different types of motion blur and image degradation.

BRIEF DESCRIPTION OF DRAWINGS

The patent or application file contains at least one drawing executed in color. Copies of this patent or patent application publication with color drawing(s) will be provided by the Office upon request and payment of the necessary fee.

To facilitate further description of the embodiments, the following drawings are provided in which like references are intended to refer to like or corresponding parts, and in which.

DETAILED DESCRIPTION OF EXEMPLARY EMBODIMENTS

Figure 1:
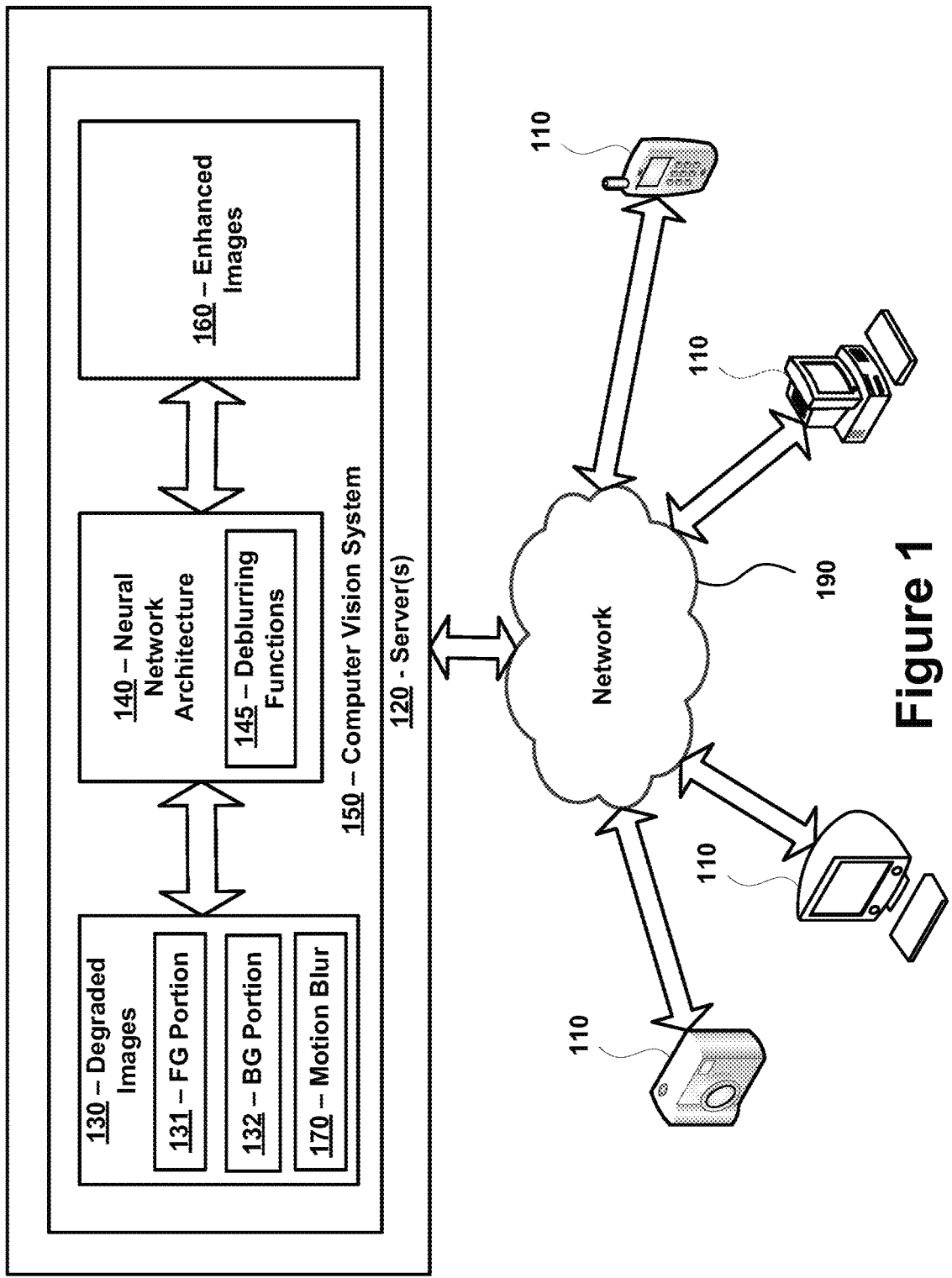
FIG. 1 is a diagram of an exemplary system for performing motion deblurring in accordance with certain embodiments.

The present disclosure relates to systems, methods, and apparatuses that provide improved techniques for performing computer vision functions including, but not limited to, motion deblurring functions. A computer vision system includes a neural network architecture that can be trained to perform these and other functions. For example, the neural network architecture may be configured to receive one or more degraded images (also referred to herein as "blurry images"), process the one or more degraded images to remove distortions associated with motion blur, and output one or more enhanced images having sharper or clearer details due, at least in part, to removal of the motion blur.

The configuration of the neural network architecture can vary. In certain embodiments, the neural network architecture comprises a human-aware attention model, an encoder network, and a multi-branch decoder network. Exemplary embodiments of the human-aware attention model, encoder network, and multi-branch decoder network are described below.

In certain embodiments, a human-aware attention model can be trained to generate foreground and/or background masks corresponding to the degraded images. The masks generated by the human-aware attention model can include binary masks that identify locations of the humans and/or other objects in foreground portions of the degraded images by setting pixel values to a particular value (e.g., 1), while identifying background portions of the degraded images by setting pixel values to another value (e.g., 0).

In certain embodiments, the encoder network may receive the degraded images, and encode the degraded images to generate new feature representations (e.g., non-linear representations) of the degraded images which can be used to predict or determine enhanced images corresponding to the degraded images. These new encoded representations include global feature information for both foreground and background portions of the degraded images. For each degraded image, the encoded representation and foreground and background masks generated by the human-aware attention model can be utilized to generate foreground feature information and background feature information. Specifically, the new encoded representation of the degraded image can be combined with a corresponding foreground mask (e.g., a human-aware foreground mask) to obtain foreground feature information, and also combined with a background mask to obtain background feature information.

In certain embodiments, the multi-branch decoder network may be configured to utilize the feature information to generate deblurring information for creating one or more enhanced images from each of the degraded images. For example, with respect to each of the degraded images, the multi-branch decoder is configured to generate deblurring information and utilize the deblurring information to transform the degraded image into an enhanced image that does not include, or at least reduces an amount of, the motion blur associated with the degraded image.

According to certain exemplary embodiments, the multi-branch decoder network comprises at least three decoding branches: a foreground decoding branch; a background decoding branch; and, a global decoding branch. The foreground decoding branch may receive the foreground feature information derived from a degraded image and utilize this information to perform deblurring functions on foreground portions (e.g., which may include human objects and/or other objects) of the degraded image. The background decoding branch may receive the background feature information derived from the degraded image and utilize this information to perform deblurring functions on background portions of the degraded image. The global decoding branch may receive the global feature information included in the encoded representation of the degraded image and utilize this information to perform deblurring functions on the entirety of the image. The outputs from each of the branches may be then be fused and/or combined to reconstruct an enhanced image that has sharp details and which does not include motion blur (or at least which reduces the motion blur). In certain embodiments, reconstructing the enhanced image may include embedding the deblurring information from the foreground and background decoding branches into the output of the global decoding branch.

As mentioned above, the foreground portions and background portions of the image often undergo different types of image degradation or motion blur. Because the multi-branch encoder is able to separately perform deblurring operations on the heterogeneous foreground and background motion blurs captured in the degraded image (e.g., using separate foreground and background decoding branches), a more accurate enhanced image can be reconstructed from the degraded image.

A unique training dataset can be constructed to facilitate accurate training of the human-aware attention model and/or other components of the neural network architecture. The training dataset can include corresponding pairs of blurry and sharp training images, as well as training images that include dense annotations (e.g., using bounding boxes and/or other ground-truth annotations) identifying humans in foreground portions of the training images. Preferably, the training images span a broad range of scenes, human object sizes, motion patterns, and background complexities.

The technologies discussed herein can be used in a variety of different contexts and environments. Generally speaking, the technologies disclosed herein may be integrated into any application, device, apparatus, and/or system that can benefit from motion deblurring. In certain embodiments, the technologies can be incorporated directly into image capturing devices (e.g., cameras, video cameras, smart phones, etc.) to enable these devices to produce images with greater accuracy and quality. These technologies additionally, or alternatively, can be incorporated into applications that perform post-processing operations on images captured by image capturing devices (e.g., such as image editing applications that permit a user to alter or edit images). These technologies can be integrated with, or otherwise applied to, images that are made available by various systems (e.g., surveillance systems, facial recognition systems, automated vehicular systems, social media platforms, etc.). The technologies discussed herein can also be applied to many other contexts as well.

As evidenced by the disclosure herein, the inventive techniques set forth in this disclosure are rooted in computer technologies that overcome existing problems in known computer vision systems, specifically problems dealing with motion blur in images. The techniques described in this disclosure provide a technical solution (e.g., one that utilizes various AI-based neural networking and/or machine learning techniques) for overcoming the limitations associated with known techniques. For example, the image reconstruction techniques described herein take advantage of novel AI and machine learning techniques to learn functions for detecting foreground/background portions of degraded images, encoding feature information corresponding to degraded images, and/or performing decoding operations to reconstruct enhanced images that have clear and vivid details. Moreover, in certain embodiments, these functions can be learned, at least in part, using a specialized dataset that is specifically constructed to address motion deblurring problems. This technology-based solution marks an improvement over existing capabilities and functionalities related to computer vision systems by improving the accuracy and quality of images that are generated and/or reconstructed.

In certain embodiments, a system is provided. The system includes one or more computing devices comprising one or more processors and one or more non-transitory storage devices for storing instructions, wherein execution of the instructions by the one or more processors causes the one or more computing devices to: receive, at a neural network architecture, a degraded image that includes motion blur, the degraded image comprising a foreground portion and a background portion; analyze, using a human-aware attention model associated with the neural network architecture, the degraded image to generate one or more human-aware attention masks; generate, using an encoder associated with the neural network architecture, an encoded representation of the degraded image; generate, using the encoded representation and the one or more human-aware attention masks, foreground feature information and background feature information corresponding to the degraded image; receive, at a multi-branch decoder of the neural network architecture, the foreground feature information and the background feature information; separately perform, with the multi-branch decoder of the neural network architecture, deblurring functions on the foreground portion and the background portion of the degraded image using the foreground feature information and the background feature information; and reconstruct an enhanced image corresponding to the degraded image.

In certain embodiments, a method is provided. The method comprises: analyzing, using a human-aware attention model associated with the neural network architecture, the degraded image to generate one or more human-aware attention masks; generating, using an encoder associated with the neural network architecture, an encoded representation of the degraded image; generating, using the encoded representation and the one or more human-aware attention masks, foreground feature information and background feature information corresponding to the degraded image; receiving, at a multi-branch decoder of the neural network architecture, the foreground feature information and the background feature information; separately performing, with the multi-branch decoder of the neural network architecture, deblurring functions on the foreground portion and the background portion of the degraded image using the foreground feature information and the background feature information; and reconstructing an enhanced image corresponding to the degraded image.

In certain embodiments, a computer program product is provided for performing computer vision functions. The computer program product comprises a non-transitory computer-readable medium including instructions for causing a computer to: receive, at a neural network architecture, a degraded image that includes motion blur, the degraded image comprising a foreground portion and a background portion; analyze, using a human-aware attention model associated with the neural network architecture, the degraded image to generate one or more human-aware attention masks; generate, using an encoder associated with the neural network architecture, an encoded representation of the degraded image; generate, using the encoded representation and the one or more human-aware attention masks, foreground feature information and background feature information corresponding to the degraded image; receive, at a multi-branch decoder of the neural network architecture, the foreground feature information and the background feature information; separately perform, with the multi-branch decoder of the neural network architecture, deblurring functions on the foreground portion and the background portion of the degraded image using the foreground feature information and the background feature information; and reconstruct an enhanced image corresponding to the degraded image.

The embodiments described in this disclosure can be combined in various ways. Any aspect or feature that is described for one embodiment can be incorporated into any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature or component that is described in the present application may be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates or transports the program for use by or in connection with the instruction execution system, apparatus or device. The medium can be a magnetic, optical, electronic, electromagnetic, infrared, or semiconductor system (or apparatus or device) or a propagation medium. The medium may include a computer-readable storage medium, such as a semiconductor or solid state memory, magnetic tape, a removable computer diskette, a random access memory (RAM), a read-only memory (ROM), a rigid magnetic disk, an optical disk, etc.

A data processing system suitable for storing and/or executing program code may include at least one processor coupled directly or indirectly to memory elements through a system bus. The memory elements can include local memory employed during actual execution of the program code, bulk storage and cache memories that provide temporary storage of at least some program code to reduce the number of times code is retrieved from bulk storage during execution. Input/output or I/O devices (including, but not limited to, keyboards, displays, pointing devices, etc.) may be coupled to the system either directly or through intervening I/O controllers.

Network adapters may also be coupled to the system to enable the data processing system to become coupled to other data processing systems, remote printers, or storage devices through intervening private or public networks. Modems, cable modems and Ethernet cards are just a few of the currently available types of network adapters.

FIG. 1 is a diagram of an exemplary system 100 in accordance with certain embodiments. The system 100 comprises one or more computing devices 110 and one or more servers 120 that are in communication over a network 190. A computer vision system 150 is stored on, and executed by, the one or more servers 120. The network 190 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

All the components illustrated in FIG. 1, including the computing devices 110, servers 120, and computer vision system 150, can be configured to communicate directly with each other and/or over the network 190 via wired or wireless communication links, or a combination of the two. Each of the computing devices 110, servers 120, and computer vision system 150 can also be equipped with one or more transceiver devices, one or more computer storage devices (e.g., RAM, ROM, PROM, SRAM, etc.), and one or more processing devices (e.g., central processing units, graphics processing units, etc.) that are capable of executing computer program instructions. The computer storage devices can be physical, non-transitory mediums.

In certain embodiments, the computing devices 110 may represent desktop computers, laptop computers, mobile devices (e.g., smart phones, personal digital assistants, tablet devices, vehicular computing devices, wearable devices, and/or any other device that is mobile in nature), and/or other types of devices. The one or more servers 120 may generally represent any type of computing device, including any of the computing devices 110 mentioned above. In certain embodiments, the one or more servers 120 comprise one or more mainframe computing devices that execute web servers for communicating with the computing devices 110 and other devices over the network 190 (e.g., over the Internet).

In certain embodiments, the computer vision system 150 is stored on, and executed by, the one or more servers 120. The computer vision system 150 can be configured to perform any and all operations associated with analyzing degraded images 130, generating enhanced images 150, performing motion deblurring functions 145, and/or executing other related functions.

The degraded images 130 provided to, and analyzed by, the computer vision system 150 can include any type of image. In certain embodiments, the degraded images 130 can include one or more two-dimensional (2D) images. In certain embodiments, the degraded images 130 may additionally, or alternatively, include one or more three-dimensional (3D) images. The degraded images 130 may be captured in any digital or analog format, and using any color space or color model. Exemplary image formats can include, but are not limited to, JPEG (Joint Photographic Experts Group), TIFF (Tagged Image File Format), GIF (Graphics Interchange Format), PNG (Portable Network Graphics), etc. Exemplary color spaces or models can include, but are not limited to, sRGB (standard Red-Green-Blue), Adobe RGB, gray-scale, etc.

The degraded images 130 received by the computer vision system 150 can be captured by any type of image capturing device. The image capturing devices can include any devices that include an imaging sensor, camera and/or optical device. For example, the image capturing device may represent still image cameras, video cameras, and/or other devices that include image/video sensors. The image capturing devices can also devices that include imaging sensors, cameras, and/or optical devices which are capable of performing other functions unrelated to capturing images. For example, the image capturing device can include mobile devices (e.g., smart phones or cell phones), tablet devices, computing devices, desktop computers, etc. The image capturing devices can be equipped with analog-to-digital (A/D) converters and/or digital-to-analog (D/A) converters based on the configuration or design of the camera devices. In certain embodiments, the computing devices 110 shown in FIG. 1 can include any of the aforementioned image capturing devices, or other types of image capturing devices.

The degraded images 130 provided to the computer vision system 150 can depict, capture, or otherwise correspond to any type of scene. For example, the degraded images 130 provided to the computer vision system 150 can include images 130 that depict natural scenes, indoor environments, and/or outdoor environments. Each of the degraded images 130 (or the corresponding scenes captured in the degraded images 130) can include one or more objects. Generally speaking, any type of object may be included in an image 130, and the types of objects included in an image 130 can vary greatly. The objects included in an image 130 may correspond to various types of living objects (e.g., human beings, animals, plants, etc.), inanimate objects (e.g., beds, desks, windows, tools, appliances, industrial equipment, curtains, sporting equipment, fixtures, vehicles, etc.), structures (e.g., buildings, houses, etc.), and/or the like. In certain embodiments, some or all of the degraded images comprise at least one object corresponding to a human. The term "object," as used herein, is intended to be used very broadly and may refer to any physical or non-physical entity that is capable of being captured in an image.

Each of the degraded images 130 can include a foreground portion 131 and a background portion 132. Generally speaking, the foreground portion 131 of an image may include objects (e.g., such as humans, inanimate objects, etc.) that are located closer to an image capturing device (or a sensor of the image capturing device) relative to the background portion 132. Conversely, the background portion 132 of an image may include scenery and/or objects that are located further away from the image capturing device (or a sensor of the image capturing device) relative to the foreground portion 131.

As mentioned above, the foreground portions 131 and background portions 132 of the scene often undergo different types of image degradation and experience motion blur 170 in different ways. Generally speaking, motion blur 170 can include streaking of objects (e.g., humans, inanimate objects, etc.) in an image or sequence of frames. In some cases, motion blur 170 may result, at least in part, from the movement of objects during the recording of an exposure, and/or the movement of an image capturing device during the recording of an exposure. Motion blur 170 cause streaking artifacts and/or blurring artifacts to appear in images, thus degrading the quality and clarity of the images. Some or all of the degraded images 130 analyzed by the computer vision system 150 can include motion blur 170.

The degraded images 130 received by the computer vision system 150 can be provided to the neural network architecture 140 for processing and/or analysis. In certain embodiments, the neural network architecture 140 may comprise a convolutional neural network (CNN) or a plurality of convolutional neural networks. Each CNN may represent an artificial neural network (e.g., which is inspired by biological processes) and may be configured to analyze degraded images 130 and to execute deep learning functions and/or machine learning functions on the degraded images 130. Each CNN may include a plurality of layers including, but not limited to, one or more input layers, one or more output layers, one or more convolutional layers (e.g., that include learnable filters), one or more ReLU (rectifier linear unit) layers, one or more pooling layers, one or more fully connected layers, one or more normalization layers, etc. The configuration of the CNNs and their corresponding layers enable the CNNs to learn and execute various functions for analyzing, interpreting, understanding, enhancing, and/or reconstructing images.

In certain embodiments, the neural network architecture 140 can trained to perform one or more computer vision functions to analyze and enhance the degraded images 130. For example, for each degraded image, the neural network architecture 140 can be configured to analyze the degraded image 130 (e.g., to detect foreground and background features) and to perform deblurring functions 145 on the degraded image 130. The deblurring functions 145 may include any functions associated with detecting motion blur 170 in the degraded image 130, removing motion blur 170 from the degraded image 130, and/or reconstructing an enhanced image 160.

The neural network architecture 140 of the computer vision system 150 is configured to reconstruct, generate and/or output enhanced images 160 corresponding to the degraded images 130. Generally speaking, an enhanced image 160 may include any image that has reduced motion blur 170 relative to a corresponding degraded image 170. The enhanced images 160 can be output in any format including, but not limited to, those mentioned above. For each degraded or blurry image 130, the neural network architecture 140 aims to remove any motion blur 170 included in the degraded image 170 in reconstructing or generating the enhanced images 160. In certain embodiments, in addition to removing motion blur 170, the neural network architecture 140 may be configured to perform other functions that improve the quality and/or clarity of the degraded images 130. For example, in reconstructing or generating the enhanced images 160, the neural network architecture 140 may be configured to remove other types of visual artifacts and/or distortions (e.g., due to compression, noise, ghosting, etc.) that are included in the degraded images in addition to removing motion blur 170.

In addition to outputting enhanced images 160, the neural network architecture 140 may also be configured to output analysis information associated with one or more of the images analyzed by the neural network architecture 140. The analysis information can generally include any information or data associated with analyzing, interpreting and/or understanding the degraded images 130, as well as include any information or data associated with generating, reconstructing and/or producing the enhanced images 160. For example, the analysis information may include data or information that: identifies (e.g., using bounding boxes and/or other annotations) locations of human objects in the degraded images 130; identifies locations of motion blur 170 in the degraded images 130; indicates the extent of motion blur 170 in degraded images 130; indicates quality or clarify information relating to the enhanced images 160; indicates quality comparisons between degraded images 130 and corresponding enhanced images 170; and/or provides metrics relating to performance of the neural network architecture 140 and/or deblurring functions 145 executed by the neural network architecture 140.

In the exemplary system 100 shown in FIG. 1, the computer vision system 150 may be stored on and executed by the one or more servers 120. In other exemplary systems, the computer vision system 150 can additionally, or alternatively, be stored on and executed by the computing devices 110 and/or other devices. For example, in certain embodiments, the computer vision system 150 can be integrated directly into an image capturing device 110 to enable the device to produce enhanced images 160 using the techniques described herein. Likewise, the computer vision system 150 can also be stored as a local application on a computing device 110 (e.g., such as a mobile device, personal computer, and/or server) to implement the techniques described herein. In certain embodiments, the computer vision system 150 can be integrated with (or can communicate with) various systems and applications including, but not limited to, surveillance systems and applications, automated vehicle systems and applications, image editing applications, social media applications, and/or other systems and applications that are capable of generating, utilizing, processing, and/or receiving degraded images 130.

In certain embodiments, the one or more computing devices 110 can enable individuals to access the computer vision system 150 over the network 190 (e.g., over the Internet via a web browser application and/or mobile app). For example, after an image capturing device has captured one or more degraded images 130, an individual can utilize a computing device 110 (e.g., a smart phone, camera, video camera, personal computer, etc.) to transmit the one or more degraded images 130 over the network 190 to the computer vision system 150. The computer vision system 150 can analyze the one or more degraded images 130 using the techniques described in this disclosure. One or more enhanced images 160 (as well as any analysis information) generated by the computer vision system 150 can be transmitted over the network 190 to the computing device 110 that transmitted the one or more images 130 and/or to other computing devices 110.

Figure 2:
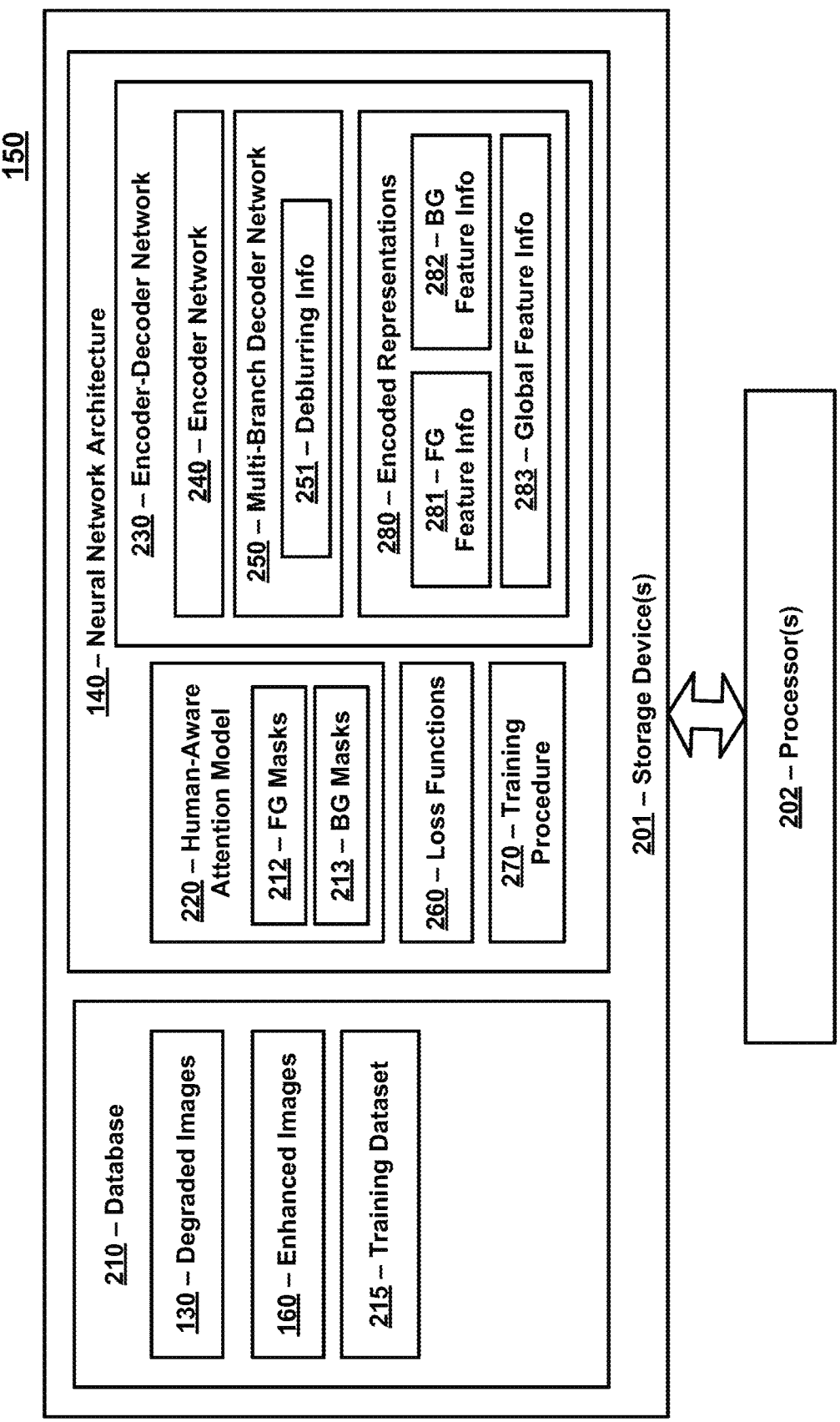
FIG. 2 is a block diagram of an exemplary computer vision system in accordance with certain embodiments.

FIG. 2 is a block diagram of a computer vision system 150 in accordance with certain embodiments of the present invention. The computer vision system 150 includes one or more storage devices 201 that are in communication with one or more processors 202. The one or more storage devices 201 can include: i) non-volatile memory, such as, for example, read only memory (ROM) or programmable read only memory (PROM); and/or (ii) volatile memory, such as, for example, random access memory (RAM), dynamic RAM (DRAM), static RAM (SRAM), etc. In these or other embodiments, storage devices 201 can comprise (i) non-transitory memory and/or (ii) transitory memory. The one or more processors 202 can include one or more graphics processing units (CPUs), central processing units (CPUs), controllers, microprocessors, digital signal processors, and/ or computational circuits. The one or more storage devices 201 can store data and instructions associated with one or more databases 210 and a neural network architecture 140 that comprises a human-aware attention model 220 and an encoder-decoder network 230. The encoder-decoder network 230 comprises an encoder network 240 and a multi-branch decoder network 250. The one or more processors 202 are configured to execute instructions associated with these components. Each of these components is described in further detail below.

The database 210 can store, inter alia, the degraded images 130 that are provided to and/or analyzed by the computer vision system 150, as well the enhanced images 160 that are reconstructed and/or generated by the computer vision system 150. In certain embodiments, the database 210 may also store any analysis information generated by the computer vision system 150.

The database 210 also stores one or more training datasets 215 that can be utilized to train the neural network architecture 140. The training dataset 215 may include a plurality of training images that are utilized to train the neural network architecture 140 (e.g., the human-aware attention model 220, encoder network 240, and/or multi-branch decoder network 250). The images included in the training set 215 may include corresponding pairs of degraded images and clear images of various scenes (e.g., such that each pair includes a degraded image of scene and a corresponding clear or enhanced image of the scene). At least some of the images included in the training dataset 215 may be annotated with bounding boxes, pixel-level annotations, and/or other ground-truth information that identifies any foreground objects (e.g., such as humans located in foreground portions 131 of the degraded images 130).

The neural network architecture 140 can be trained to perform various computer vision functions including, but not limited to, deblurring functions 145 or removing or mitigating motion blur 170 from images. Exemplary components of the neural network architecture 140 are described below.

In certain embodiments, the neural network architecture 140 includes a human-aware attention model 220. The human-aware attention model 220 can be trained (e.g., using the training dataset 215) to generate foreground masks 221 and/or background masks 222 corresponding to the degraded images 130. For example, the human-aware attention model 220 can learn to map pixels or portions of degraded images to importance maps and/or activation maps using the annotations included in the images of the training dataset 215.

The foreground masks 221 generated by the human-aware attention model 220 can include attention maps or masks that identify locations of human objects located in foreground portions 131 of scenes captured in the degraded images 140. In certain embodiments, the foreground masks 221 may additionally, or alternatively, can be generated to identify locations of other objects (e.g., inanimate objects, animals, trees, etc.) located in foreground portions 131 of the degraded images 140. The background masks 222 can include attention maps or masks that identify locations of background portions 132 of scenes captured in the degraded images 130.

In certain embodiments, foreground masks 221 and/or background masks 222 may represent binary masks. For example, the human-aware attention model 220 can generate a foreground mask 212 for a degraded image 130 by setting pixel values corresponding to foreground portions 131 of the degraded image 130 to a particular value (e.g., 1), while identifying background portions 132 of the degraded image to another value (e.g., 0). The background mask 222 for the degraded image 130 can be obtained in a similar manner, or by inverting the values associated with the corresponding foreground mask 211 for the degraded image 130.

In certain embodiments, the neural network architecture 140 further includes an encoder network 240. The encoder network 240 receives the degraded images 130 and encodes the degraded images 130 to generate new encoded representations 280 (e.g., non-linear representations) corresponding to each of the degraded images 130. Each encoded representation of a degraded image 130 includes global feature information 283. The foreground mask 212 and background mask 213 generated for the corresponding degraded image 130 by the human-aware attention model 220 can then be applied to the encoded representations 280 output by the encoder network 240 to obtain foreground feature information 281 and background feature information 282 for each of the the degraded images 130. The foreground feature information 281, background feature information 282, and global feature information 283 for each degraded image 130 can then be provided to separate branches of the multi-branch decoder network 250 to enable reconstruction of an enhanced image 160 that corresponds to the degraded image 130.

As mentioned above, before decoding operations are executed by the multi-branch decoder network 250, the neural network architecture 140 obtains three portions of feature information for each degraded image: 1) foreground feature information 281 that captures the features in the foreground portion 131 of the degraded image 130; 2) background feature information 282 that captures the features in the background portion 132 of the degraded image 130; and 3) global feature information 283 that captures the overall or global features of the degraded image 130 for both the foreground portion 131 and background portion 132 of the degraded image 130.

As explained in further detail below, the multi-branch decoder network 250 can receive each of the three portions of feature information in a separate decoding branch. For example, a first foreground decoding branch can receive the foreground feature information 281 and utilize this information to generate deblurring information 251 that assists with reconstructing the foreground portion 131 of the degraded image 130 in a manner that removes, or at least mitigates, any motion blur 170 included in the foreground portion 131 of the degraded image 130. A second background decoding branch can receive the background feature information 282 and utilize this information to generate deblurring information 251 that assists with reconstructing the background portion 132 of the degraded image 130 in a manner that removes, or at least mitigates, any motion blur 170 included in the background portion 132 of the degraded image 130. A third global decoding branch can receive the global feature information 282 and utilize this information to generate deblurring information 251 that assists with reconstructing the global degraded image 130 in a manner that removes, or at least mitigates, motion blur 170 included in the overall degraded image 130. The outputs of the three decoding branches can then be combined to reconstruct and/or generate an enhanced image 160 corresponding to the degraded image 130. Because degradation and motion blur 170 may occur differently in the foreground portion 131 and background portion 132 of the degraded image 130, this technique can be beneficial because it permits the deblurring operations to be performed separately on each of the foreground portion 131 and background portion 132.

The deblurring information 251 generated by the multi-branch decoder network 250 can include any data and/or information associated with removing motion blur 170 from degraded images 130 and/or any data or information associated with reconstructing the degraded images 130. The deblurring information 251 can include outputs generated by each decoding branch of the multi-branch decoder network 250, which are described in further detail below.

One or more training procedures 270 may be executed to train the neural network architecture 140 (e.g., the human-aware attention model 220, encoder network 240, and/or multi-branch decoder network 250). In certain embodiments, the one or more training procedures 270 may include supervised and/or semi-supervised training procedures 270 that utilize annotated training images to train the neural network architecture 140. The one or more training procedures 270 may utilize one or more loss functions 260 to facilitate training of the human-aware attention model 220, encoder network 240, and/or multi-branch decoder network 250. Exemplary loss functions 260 which may be used are described in further detail below.

As mentioned above, one or more training datasets 215 can be utilized to train the neural network architecture 140 (e.g., the human-aware attention model 220, encoder network 240, and/or multi-branch decoder network 250). In certain embodiments, a newly developed large-scale training dataset, referred to as Human-aware Image DEblurring ("HIDE"), may be utilized to train the neural network architecture 140. The HIDE dataset can be constructed to perform human-aware image deblurring covering a wide range of scenes, motions, etc., and may include training images with densely annotated foreground human bounding boxes.

In certain embodiments, some or all of the training images included in the one or more training datasets 215 can be generated using data augmentation techniques. Because a dynamic blur can be caused by the relative movement between an imaging device and a scene, a blur generative model can be formulated in terms of the depth, as:

$$\delta_c = F \cdot (\Delta x / L), \quad (1)$$

where F denotes the focal length, L is the depth, and $\delta_c$ and $\Delta x$ denote the blur and actual offsets in the scene, respectively. Close-up images of humans or other objects can experience large motion blurs. This may be due to both passive camera motions as well as object movements, thus resulting in a "multiple blur" problem.

To facilitate generation of the training dataset 215, videos can be captured at 240 frames-per-second (fps) with an image capturing devices (e.g., a GoPro Hero camera). Frames from these high-fps videos can then be integrated to produce plausible motion blurs. Because the dataset can be designed to address the multiple blur problem in certain embodiments, videos can be collected with humans in a close-up view to help facilitate moving-object annotation. To incorporate diversity in the dataset, various real-world scenes having varying quantities of humans can be selected. In certain embodiments, blurred images can be synthesized by averaging 11 sequential frames from a video to simulate the degradation process, and the central frame can be kept as the corresponding sharp or clear image.

The initial collection of images can be cleaned by taking into account at least two factors. First, on account of hardware limitations, overly quick movement is equivalent to skip frames, resulting in streak artifacts in the blurred images. Second, not all images contain an explicit structure or human in the close-up, especially if massive flat areas or pure scenes are present. Thus, candidates with these drawbacks can be removed.

In certain embodiments, unlike conventional pixel-wise tasks (e.g., segmentation and parsing tasks) which preserve clear and sharp object edges for labeling, the foreground human objects are typically subject to motion displacements due to motion blur 170, and thus cannot be annotated with precise boundaries. Therefore, the foreground human objects in the training dataset 215 can be identified using bounding boxes. To improve annotation efficiency, a human detection model initially can be applied to each sharp image in training dataset set, which can provide roughly accurate human bounding boxes for most human objects. Then, the inferior results can be manually refined and annotations can be added for undetected humans. Any bounding boxes of background humans in background portions of scenes can be removed to emphasize the close-up humans in the foreground portions of the images.

Exemplary embodiments of the computer vision system 150 and the aforementioned sub-components (e.g., database 210, neural network architecture 140, image human-aware attention model 220, encoder network 240, and/or multi-branch decoder network 250, etc.) are described in further detail below. While the sub-components of the computer vision system 150 may be depicted in FIG. 2 as being distinct or separate from one other, it should be recognized that this distinction may be a logical distinction rather than a physical distinction. Any or all of the sub-components can be combined with one another to perform the functions described herein, and any aspect or feature that is described as being performed by one sub-component can be performed by any or all of the other sub-components. Also, while the sub-components of the computer vision system 150 may be illustrated as being implemented in software in certain portions of this disclosure, it should be recognized that the sub-components described herein may be implemented in hardware, software, or a combination thereof.

Figure 3:
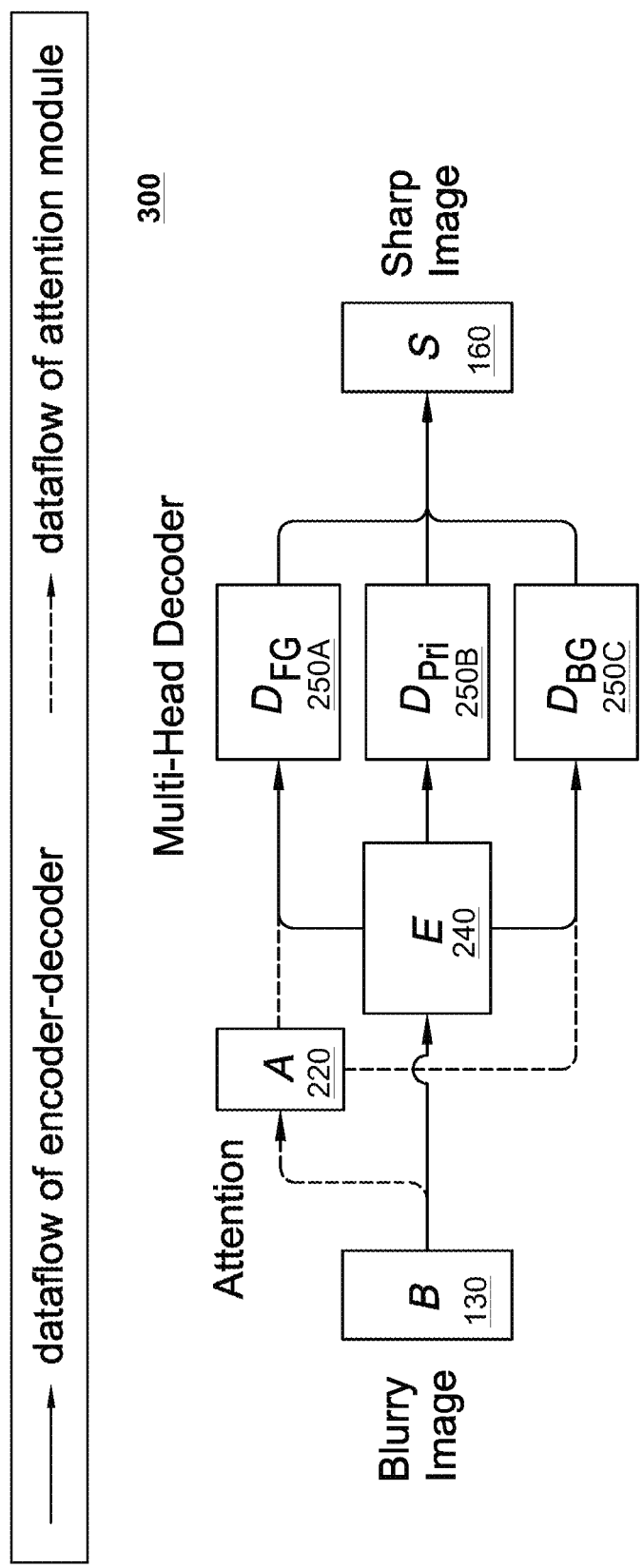
FIG. 3 is a diagram illustrating an exemplary architecture for a computer vision system in accordance with certain embodiments.

FIG. 3 is a diagram illustrating an exemplary motion deblurring model 300 in accordance with certain embodiments. The exemplary motion deblurring model 300 may be incorporated into the neural network architecture 140 to facilitate removal of motion blur 170 from degraded images 130. The motion deblurring model 300 illustrates an exemplary process flow for generating sharp or enhanced images 130. This process flow may be executed for each degraded image 130 that is received by the neural network architecture 140.

A degraded image 130 including motion blur 170 is initially received. The degraded image 130 is provided to a human-aware attention model 220 and an encoder network 240. The encoder network 240 generates an encoded representation 280 of the degraded image 130 comprising global feature information 283 covering both the foreground portion 131 and background portion 132 of the degraded image 130. The human-aware attention model 220 generates a foreground mask 212 and a background mask 213 for the degraded image 130. The foreground mask 212 and background mask 213 are applied to the encoded representation 280 to extract foreground feature information 281 and background feature information 282 for the degraded image 130.

A multi-branch decoder network 230 receives the foreground feature information 281, the background feature information 282, and the global feature information 283. The foreground feature information 281 is received at a foreground decoding branch 250A of the multi-branch decoder network 230. The foreground decoding branch 250A focuses on removing motion blur 170 from the foreground portion 131 of the degraded image 130. The foreground decoding branch 250A utilizes the foreground feature information 281 to generate deblurring information 251 for accurately reconstructing the foreground portion 131 of the degraded image 130. The background decoding branch 250C focuses on removing motion blur 170 from the background portion 132 of the degraded image 130. The background decoding branch 250C utilizes the background feature information 282 to generate deblurring information 251 for for accurately reconstructing the background portion 132 of the degraded image 130. The primary or global decoding branch 250B focuses on removing motion blur 170 from the overall degraded image 130, including both the foreground portion 131 and background portion 132 of the degraded image 130. The primary decoding branch 250B utilizes the global feature information 282 to generate deblurring information 251 for reconstructing the degraded image 130.

The outputs of the foreground decoding branch 250A, primary or global decoding branch 250B, and background decoding branch 250C are fused or combined to produce an enhanced image 160 corresponding to the degraded image 130. In certain embodiments, the outputs of the foreground decoding branch 250A and background decoding branch 250C are integrated into the output of the primary or global decoding branch 250B to generate the enhanced image 160.

Figure 4:
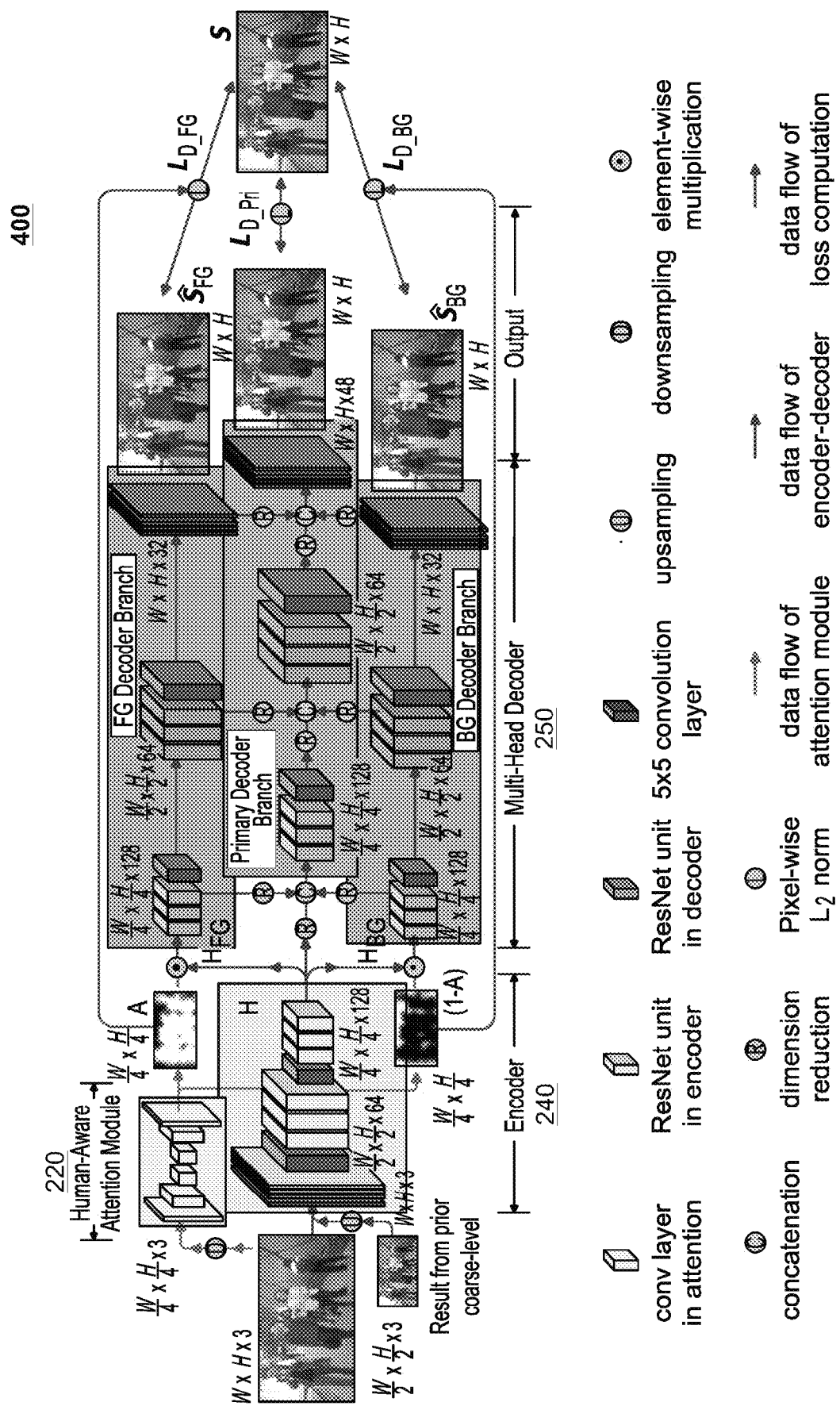
FIG. 4 is a diagram illustrating an exemplary architecture for a computer vision system in accordance with certain embodiments.

FIG. 4 is a diagram illustrating an exemplary architecture 400 for a motion deblurring model in accordance with certain embodiments. The architecture 400 illustrates, inter alia, exemplary configurations for the human-aware attention model 220, encoder network 240, and multi-branch decoder network 250 (also referred to as "multi-head decoder").

The architecture 400 is built upon a convolutional encoder-decoder network 230 which includes an encoder network $\mathcal{E}$ (230) and a multi-branch decoder network $\mathcal{D}$ (250). The encoder 230 and decoder 250 may be comprised of a stack of convolutional and transposed convolutional layers, respectively, interleaved with non-linear pointwise nonlinearity (e.g., sigmoid). The encoder network 230 is configured to extract a new encoded representation $H \in \mathbb{R}^{w \times h \times c}$ from an input blurry image $B \in \mathbb{R}^{W \times H \times 3}$, which is used to predict the corresponding sharp image $\check{S} \in \mathbb{R}^{W \times H \times 3}$ by the decoder:

$$H = \mathcal{E}(B; W\mathcal{E}), \check{S} = \mathcal{D}(H; W\mathcal{D}), \quad (2)$$

where $W\mathcal{E}$ and $W\mathcal{D}$ are a stack of learnable convolutional kernels for the encoder and decoder, respectively. The non-linear activation layers and bias term are omitted for convenience.

A supervised, human-aware attention model 220 may be incorporated into the encoder-decoder network 230 to explicitly encode foreground human information into the neural network architecture 140. Before addressing specific configurations for an exemplary human-aware attention model 220, a general formulation of differentiable neural attention model is provided. In such model, $x \in \mathbb{R}^{K \times C}$ may represent an input tensor, $z \in \mathbb{R}^{k \times c}$ may represent a feature obtained from x, $a \in [0,1]^k$ may represent a soft attention vector, $g \in \mathbb{R}^{k \times c}$ may represent an attention-enhanced feature, and $A: \mathbb{R}^{K \times C} \to \mathbb{R}^k$ may represent an attention network that learns to map x to a significance vector $y \in \mathbb{R}^k$. The neural attention can be implemented as:

$$a = \sigma(y) = \sigma(A(x)), \text{ and } g = a \odot z, \quad (3)$$

where $\sigma$ indicates an activation function that maps the significance value into [0, 1], and $\odot$ is element-wise multiplication.

One attention strategy is to apply a softmax operation over y and learn equation (3) in an implicit manner. However, because the architecture 400 can be configured to address an image reconstruction task, it can be advantageous to extend the implicit attention mechanism into a spatial domain. Similar to equation (3), the human-aware attention model, $A: \mathbb{R}^{W \times H \times 3} \to \mathbb{R}^{w \times h}$, may learn to map the input blurry image $B \in \mathbb{R}^{W \times H \times 3}$ to an importance map $Y = A(B) \in \mathbb{R}^{w \times h}$. In certain embodiments, an attention map $A \in [0,1]^{w \times h}$ can be computed as follows:

$$A = \sigma(Y) = \text{sigmoid}(A(B)). \quad (4)$$

Because the training dataset 215 includes training images that comprise ground-truth annotations identifying humans, the sum-to-one constraint of softmax can be relaxed and, instead, a sigmoid activation function can be used, which may only constrain the attention response values ranging from 0 to 1: $A_{i,j} = 1/(1+\exp(-Y_{i,j}))$. Furthermore, supervision can be added from human annotation over the attention map A, such that the attention network A can be trained by minimizing the following pixel-wise $L_2$ loss:

$$\mathcal{L}_A = \|G - A\|_2^2, \quad (5)$$

where $G \in \{0,1\}^{w \times h}$ represents the binary foreground human mask. In this way, the attention map A can encode foreground human information in a fully differentiable and supervised manner, which can be viewed as a soft foreground mask.

A foreground human-aware attention-enhanced feature $H_{FG} \in \mathbb{R}^{w \times h \times c}$ can then be obtained as follows:

$$H_{FG} = A \odot H. \quad (6)$$

Similarly, a soft background mask can be obtained through $(1-A) \in [0,1]^{w \times h}$, and it can be used it to obtain a background-aware attention-enhanced feature $H_{BG} \in \mathbb{R}^{q \times h \times c}$ as follows:

$$H_{BG} = (1-A) \odot H. \quad (7)$$

In this manner, foreground human information and background information are able to be encoded into the attention-enhanced features, $H_{FG}$ and $H_{BG}$, while the overall image information is stored in H.

The original image feature H and enhanced features $H_{FG}$ and $H_{BG}$ can then be provided to multi-branch decoder network 250. As shown in FIG. 3, the multi-branch decoder network 250 can include three branches: a foreground decoding branch 250A, a background decoding branch 250C, and a primary or global decoding branch 250B. Each branch takes the corresponding encoder features as inputs, and performs deblurring over the corresponding regions:

$$\hat{S}_{FG} = \mathcal{D}_{FG}(H_{FG}), \hat{S}_{BG} = \mathcal{D}_{BG}(H_{BG}), \text{ and } \hat{S} = \mathcal{D}_{Pri}(H). \quad (8)$$

In certain embodiments, the three decoder branches have similar network architectures, but do not employ weight sharing. An important role performed by multi-branch decoder network 250 relates to preserving domain-specific features via individual foreground decoding branch 250A and background decoding branch 250C.

To further assist the foreground decoder branch $D_{FG}$ and background decoder branch $\mathcal{D}_{BG}$ with focusing on their corresponding regions, their corresponding deblurring loss functions can be formulated as:

$$\mathcal{L}_{D\_FG} = G \odot \|S - \hat{S}_{FG}\|_2^2.$$

$$\mathcal{L}_{D\_BG} = (1-G) \odot \|S - \hat{S}_{BG}\|_2^2. \quad (9)$$

To demonstrate this impact, consider $\mathcal{D}_{FG}$ as an example. By multiplying the mean squared error II II with the binary foreground human mask G, the errors in the background regions cannot be propagated back. This enables $\mathcal{D}_{FG}$ to handle foreground blurs with more specific knowledge. Similarly, the use of (1−G) enables $\mathcal{D}_{BG}$ to concentrate more on the deblurring operations for the background regions.

$\mathcal{D}_{FG}$ and $\mathcal{D}_{BG}$ capture domain-specific deblurring information, while the primary decoder $\mathcal{D}_{Pri}$ accounts for global information. To make use of different deblurring information from different decoders in an integrated or collaborative manner, our idea is to use the specific knowledge from the $\mathcal{D}_{FG}$ and $\mathcal{D}_{BG}$ branches to support $\mathcal{D}_{Pri}$. Instead of simply fusing their deblurring outputs (i.e., $\hat{S}_{FG}$, $\hat{S}_{BG}$, and $\hat{S}$) in a shallow manner (e.g., which would likely produce artifacts and inferior results), a deep knowledge fusion strategy can be adopted that injects multiple intermediate features of $\mathcal{D}_{FG}$ and $\mathcal{D}_{BG}$ into $\mathcal{D}_{Pri}$.

More specifically, each decoder has a total of L transposed convolutional blocks. The features of the $l$-th block of $\mathcal{D}_{FG}$ ($\mathcal{D}_{BG}$) can be denoted as $D_{FG}^l (D_{BG}^l) \in \mathbb{R}^{w^l \times h^l \times c^l}$, where $l \in \{0, \ldots, L\}$, and the corresponding l-th layer feature of $\mathcal{D}_{Pri}$ can be recursively defined as:

$$D_{Pri}^l = D_{Pri}^l (<D_{FG}^{l-1}, D_{BG}^{l-1}, D_{Pri}^{l-1}>), \quad (10)$$

where $D_{FG}^0 = H_{FG}$, $D_{BG}^0 = H_{BG}$, $D_{Pri}^0 = H$, and $<\bullet<\bullet$i indicates concatenation. The following can be used for the final L-th layer of $\mathcal{D}_{Pri}$:

$$\hat{S} = D_{Pri}^L. \quad (11)$$

As the primary decoder $\mathcal{D}_{Pri}$ comprehensively embeds domain-specific information and global deblurring information, its loss function is designed over the whole image domain:

$$\mathcal{L}_{D\_Pri} = \|S - \hat{S}_{Pri}\|_2^2. \quad (12)$$

Further details regarding exemplary implementations of the human-aware attention model 220, encoder network 240, and multi-branch decoder network 250 are provided below.

In certain embodiments, the human-aware attention model 220 may be constructed using three convolutional layers, interleaved with ×2 max pooling and ReLU, which are stacked for effective image representation. Additionally, three transposed convolutional layers (each with a ×2 dilation rate and ReLU) can be further incorporated to enhance the image representation and spatial resolution. A 1×1 convolutional layer with sigmoid nonlinearity can also be added to produce a foreground human prediction map A having the same size as the input image B using equation (4).

In certain embodiments, the encoder network ε (240) comprises nine residual units. A 5×5 convolutional layer can be embedded between each of three residual layer sets for dimensionality reduction. Additionally, the feature H can obtained or output from the encoder network 240, it can be and used in conjunction with attention map A (using a down-sampling operation that is adopted) to obtain the enhanced features, $H_{FG}$ and $H_{BG}$ using equations (6) and (7), respectively.

In certain embodiments, the multi-head decoder network 250 can include three decoder branches, $\mathcal{D}$, $\mathcal{D}_{FG}$, and $\mathcal{D}_{BG}$, that can be configured to reconstruct the input blurred image in their corresponding regions. Each of the branches may include a structure symmetrical to the encoder network (e.g., comprising of nine transposed layers interleaved with dimensionality-reduction convolutional layers). In addition, a shortcut connection can be embedded between the encoder network 230 and each branch of the multi-head decoder network 250 to compensate for generalization error. Before fusing the enhanced features ($H_{FG}$ and $H_{BG}$) into the primary branch (e.g., using equation (11)), a 1×1 convolutional layer may be used as a feature-compression layer. The enhanced features can then be concatenated to compensate the final deblurring task (e.g., using equation (10)).

As demonstrated above, exemplary neural network architecture 140 may employ a three-branch decoder architecture wherein two branches are learned for sharpening foreground human information and background details, respectively, while a third branch produces global, harmonious results by comprehensively fusing multi-scale deblurring information from the two domains. In certain embodiments, weights can be shared between scales or branches to reduce the number of trainable parameters. The multi-scale network can be configured to undergo a continuous training mechanism by integrating the degraded inputs with previous results. Features can be extracted in each scale to enrich spatial information, and the upper-scale representations can be extended by reusing the former collection. For the first scale, the input blurry image can be repeated to provide a feed-forward formulation. A convolutional layer with a stride of 2 and 4×4 transposed convolutional layer can be used to carry out down-sampling and up-sampling operations, respectively.

Extensive comparative experiments and ablation studies were conducted which demonstrate the effectiveness and superiority of the techniques described herein. An exemplary implementation of the HIDE dataset was developed which included 8,422 sharp and blurry image pairs, extensively annotated with 37,985 human bounding boxes. The images were carefully selected from 31 high-fps videos to cover realistic outdoor scenes containing humans with various numbers, poses and appearances at various distances. For certain embodiments, the images in the dataset can be split into separate training and test sets (with no overlap in source videos). In certain embodiments, the dataset can be split to include 6,397 training images and 2,025 test images.

The training datasets 215 employed during testing included training images from the HIDE dataset and the GoPro public dataset. There were 10,742 training images in total with a size of 1280×720. The GoPro dataset was only used to train the background decoder branch 250C, due to the fact that it contains relatively few images with humans. A 256×256 patch was cropped for each image and a batch size of 10 was used for each iteration. In addition, because the background portions of images comprise significant fractions of the training images, random cropping will cause an imbalance of training data for the background decoder branch 250C and the foreground decoder branch 250A. To alleviate this issue, patches were cropped so that the fractions of BG and pedestrians in each mini-batch are harmonious. An Adam optimizer was used with an initial learning rate of $1e^{-4}$. The attention network was first pre-trained with 70,000 iterations for convergence. Then, the whole deblurring network was trained over 500 epochs. For quantitative evaluation, Peak Signal-to-Noise-Ratio (PSNR) and Structural Similarity Index (SSIM) were adopted.

Figure 5:
FIG. 5 is a flow diagram demonstrating exemplary motion deblurring results in accordance with certain embodiments.
Figure 5:
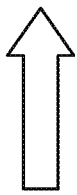
Figure 5:
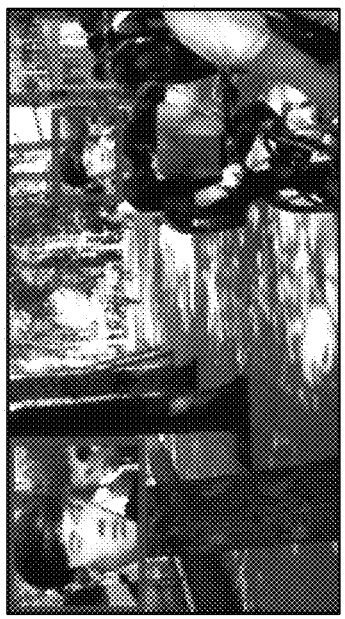

FIG. 5 demonstrates exemplary motion deblurring results in accordance with certain embodiments. A blurry or degraded image 130 is shown that is affected by the multiple blur problem (e.g., it includes distortions due to both object movement and imaging device movement). The enhanced image 160 located on the right demonstrates an output that was generated by an exemplary implementation of the neural network architecture 140. As shown, the enhanced image 160 includes sharp, vivid details when compared to the blurry or degraded image 130.

Figure 6:
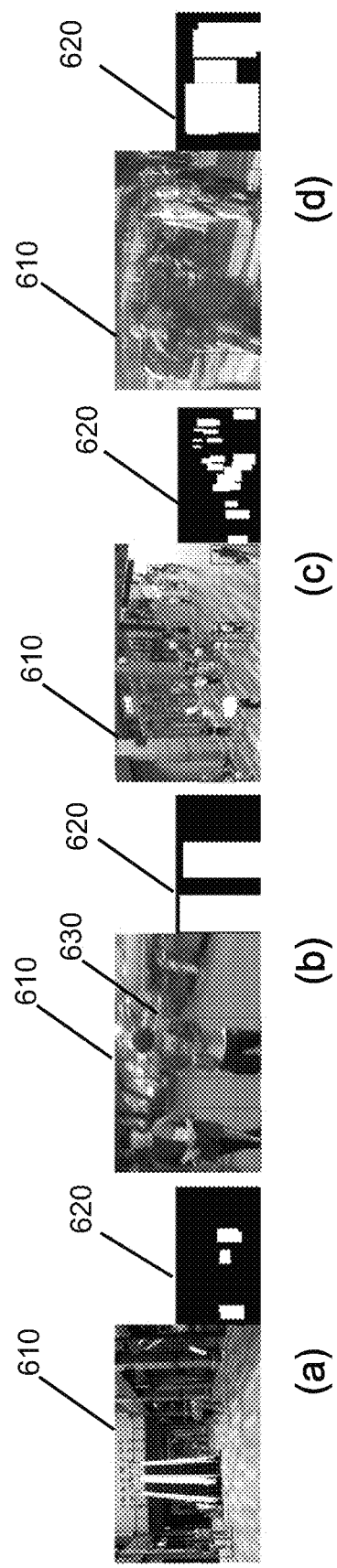
FIG. 6 is illustrates exemplary training images and attention masks in accordance with certain embodiments.

FIG. 6 demonstrates four exemplary training images 610 that may be utilized to train the human-aware attention model 220 and/or other components of the neural network architecture 140. Each of the training images 610 includes annotations 630 (e.g., bounding boxes) that identify locations of foreground humans in the images. To the right of each training image 610 is a mask 630 that corresponds to the image 610. The mask 630 may represent a human-aware foreground mask 212 or background mask 213 that is generated by the human-aware attention model 220. The human-aware attention model 220 can be trained to generate the masks 630 by analyzing the training images 610 and their annotations 630.

Figure 7:
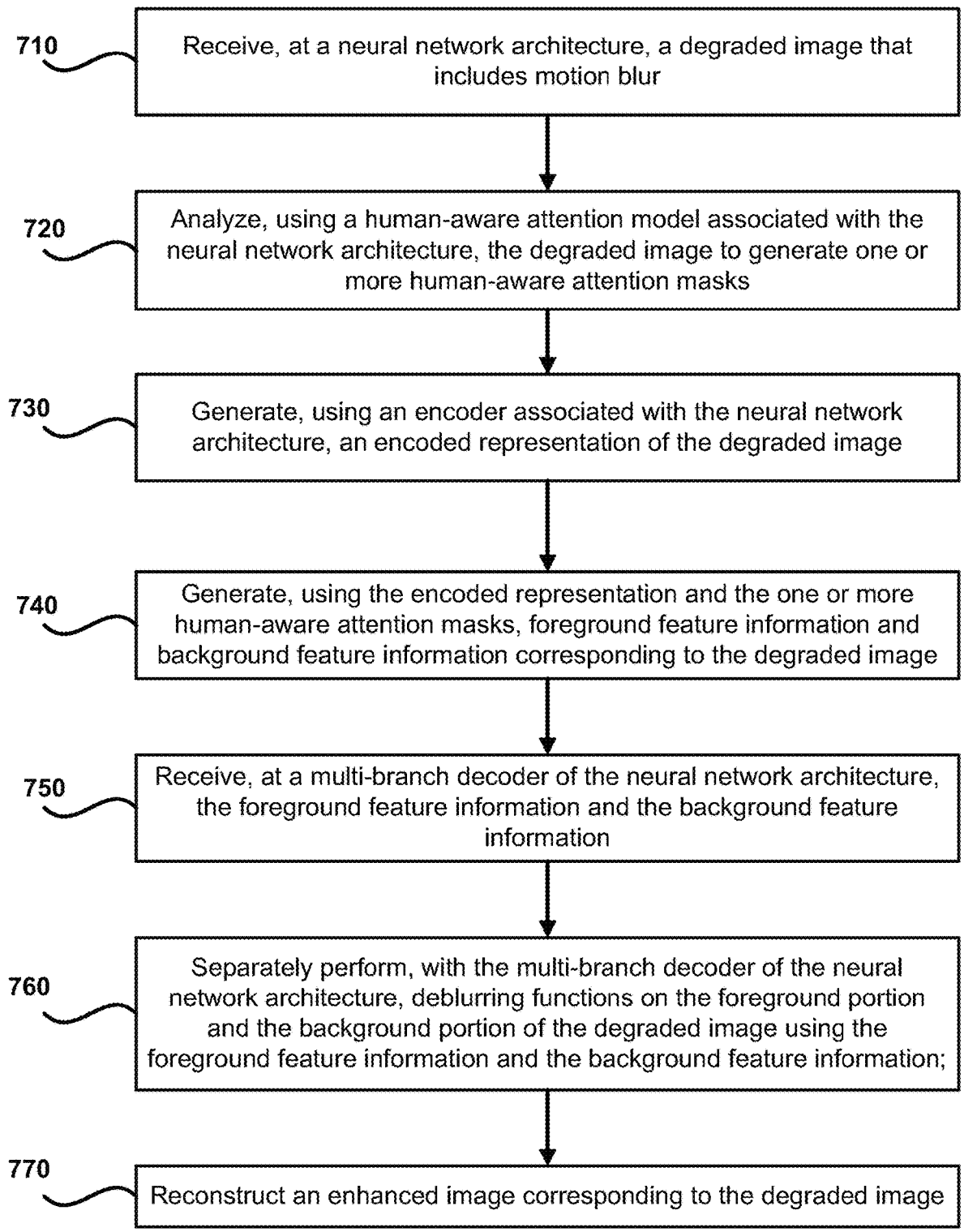
FIG. 7 is a flow chart of an exemplary method according to certain embodiments.

FIG. 7 illustrates a flow chart for an exemplary method 700 according to certain embodiments. Method 700 is merely exemplary and is not limited to the embodiments presented herein. Method 700 can be employed in many different embodiments or examples not specifically depicted or described herein. In some embodiments, the steps of method 700 can be performed in the order presented. In other embodiments, the steps of method 700 can be performed in any suitable order. In still other embodiments, one or more of the steps of method 700 can be combined or skipped. In many embodiments, computer vision system 150 can be suitable to perform method 700 and/or one or more of the steps of method 700. In these or other embodiments, one or more of the steps of method 700 can be implemented as one or more computer instructions configured to run at one or more processing modules (e.g., processor 202) and configured to be stored at one or more non-transitory memory storage modules (e.g., storage device 201). Such non-transitory memory storage modules can be part of a computer system, such as computer vision system 150, system 100, model 300, and/or architecture 400.

At step 710, a degraded image 130 that includes motion blur 170 is received at a neural network architecture 140. The motion blur 170 in the degraded image 130 may be included in a foreground portion 131 and/or a background portion 132 of the degraded image 130.

At step 720, the degraded image 130 is analyzed using a human-aware attention model 220 to generate one or more human-aware attention masks (e.g., one or more human-aware foreground masks 212 or background masks 213) corresponding to the degraded image 130. The one or more human-aware attention masks may represent one or more binary marks that identify human objects located in the foreground portion 131 of the degraded image 130.

At step 730, an encoded representation 280 of the degraded image 130 is generated using an encoder 240 associated with the neural network architecture 140. The encoded representation 280 may represent a non-linear representation of the degraded image 130 that includes global feature information 283.

At step 740, foreground feature information 281 and background feature information 282 corresponding to the degraded image 130 is generated, at least in part, using the encoded representation 280 and the one or more human-aware attention masks.

At step 750, the foreground feature information 281 and the background feature information 282 is received at a multi-branch decoder 250 of the neural network architecture 140. For example, in certain embodiments, the foreground feature information 281 may be received at a foreground decoder branch 250A of the multi-branch decoder 250, and the background feature information 282 may be received at a background decoder branch 250C of the multi-branch decoder 250.

At step 760, the multi-branch decoder 150 of the neural network architecture 140 separately performs deblurring functions 145 on the foreground portion 131 and the background portion 132 of the degraded image 130 using the foreground feature information 281 and the background feature information 282. As mentioned above, the foreground portion 131 and background portion 132 of a scene captured in the degraded image 130 may experience different types of motion blur 170 and image degradation. Thus, separately performing deblurring functions 145 on these separate portions of the degraded image 130 increases the accuracy of the deblurring functions 145 and avoids propagating errors in the separate regions of the degraded image 130.

At step 770, an enhanced image 160 is reconstructed corresponding to the degraded image 130. The enhanced image 160 removes, or at least mitigates, motion blur 170 from the scene depicted in the degraded image 130, and includes sharper details of the objects included in the scene.

While various novel features of the invention have been shown, described and pointed out as applied to particular embodiments thereof, it should be understood that various omissions and substitutions and changes in the form and details of the systems and methods described and illustrated herein may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in the system and method embodiments thereof. Those skilled in the art will appreciate that the invention can be practiced in ways other than the described embodiments, which are presented for purposes of illustration and not limitation. Variations, modifications and other implementations of what is described herein may occur to those of ordinary skill in the art without departing from the spirit and scope of the present invention and its claims.

What is claimed is:

1. A system for generating an enhanced image from a degraded image comprising:
    one or more computing devices comprising one or more processors and one or more non-transitory storage devices for storing instructions, wherein execution of the instructions by the one or more processors causes the one or more computing devices to:
        receive, at a neural network architecture, a degraded image that includes motion blur, the degraded image comprising a foreground portion and a background portion;
        analyze, using a human-aware attention model associated with the neural network architecture, the degraded image to generate one or more human-aware attention masks;
        generate, using an encoder associated with the neural network architecture, an encoded representation of the degraded image;
        generate, using the encoded representation and the one or more human-aware attention masks, foreground feature information and background feature information corresponding to the degraded image;
        receive, at a multi-branch decoder of the neural network architecture, the foreground feature information and the background feature information;
        separately perform, with the multi-branch decoder of the neural network architecture, deblurring functions on the foreground portion and the background portion of the degraded image using the foreground feature information and the background feature information; and
        reconstruct an enhanced image corresponding to the degraded image.

2. The system of claim 1, wherein the multi-branch decoder comprises:
    a foreground decoding branch that is configured to generate foreground deblurring information corresponding to the foreground portion of the degraded image;
    a background decoding branch that is configured to generate background deblurring information corresponding to the background portion of the degraded image; and
    a global decoding branch that is configured to generate global deblurring information corresponding to the degraded image.

3. The system of claim 2, wherein the foreground deblurring information, the background deblurring information, and the global deblurring information is fused or combined to reconstruct the enhanced image.

4. The system of claim 3, wherein combining the foreground deblurring information, the background deblurring information and the global deblurring information to reconstruct the enhanced image includes integrating at least a portion of the foreground deblurring information and at least a portion of the background deblurring information into the global deblurring information of the global decoding branch.

5. The system of claim 1, wherein at least a portion of the neural network architecture is trained using a training data set that comprises:
    training images that include annotations identifying human objects in foreground portions of training images.

6. The system of claim 5, wherein at least a portion of the training images are synthesized, at least in part, by averaging sequential frames from a video to simulate a degradation process.

7. The system of claim 1, wherein the encoded representation comprises global feature information corresponding to both the foreground portion and background portion of the degraded image.

8. The system of claim 1, wherein the system is integrated directly into an image capturing device.

9. The system of claim 1, wherein the system is integrated, or communicates, with one or more of: a surveillance system, a facial recognition system, an automated vehicular system, or a social media application.

10. The system of claim 1, wherein:
    the motion blur associated with the degraded image includes distortions resulting from both object movement and movement of an image capturing device; and
    the neural network architecture is trained to remove the distortions resulting from both object movement and movement of an image capturing device.

11. A method for generating an enhanced image from a degraded image comprising:
    receiving, at a neural network architecture, a degraded image that includes motion blur, the degraded image comprising a foreground portion and a background portion;
    analyzing, using a human-aware attention model associated with the neural network architecture, the degraded image to generate one or more human-aware attention masks;
    generating, using an encoder associated with the neural network architecture, an encoded representation of the degraded image;
    generating, using the encoded representation and the one or more human-aware attention masks, foreground feature information and background feature information corresponding to the degraded image;
    receiving, at a multi-branch decoder of the neural network architecture, the foreground feature information and the background feature information;
    separately performing, with the multi-branch decoder of the neural network architecture, deblurring functions on the foreground portion and the background portion of the degraded image using the foreground feature information and the background feature information; and reconstructing an enhanced image corresponding to the degraded image.

12. The method of claim 11, wherein the multi-branch decoder comprises:
   a foreground decoding branch that is configured to generate foreground deblurring information corresponding to the foreground portion of the degraded image;
   a background decoding branch that is configured to generate background deblurring information corresponding to the background portion of the degraded image; and
   a global decoding branch that is configured to generate global deblurring information corresponding to the degraded image.

13. The method of claim 12, wherein the foreground deblurring information, the background deblurring information and the global deblurring information is fused or combined to reconstruct the enhanced image.

14. The method of claim 13, wherein combining the foreground deblurring information, the background deblurring information and the global deblurring information to reconstruct the enhanced image includes integrating at least a portion of the foreground deblurring information and at least a portion of the background deblurring information into the global deblurring information of the global decoding branch.

15. The method of claim 11, wherein at least a portion of the neural network architecture is trained using a training data set that comprises:
   training images that include annotations identifying human objects in foreground portions of training images.

16. The method of claim 15, wherein at least a portion of the training images are synthesized, at least in part, by averaging sequential frames from a video to simulate a degradation process.

17. The method of claim 11, wherein the encoded representation comprises global feature information corresponding to both the foreground portion and background portion of the degraded image.

18. The method of claim 11, wherein the system is integrated directly into an image capturing device.

19. The method of claim 11, wherein:
   the motion blur associated with the degraded image includes distortions resulting from both object movement and movement of an image capturing device; and
   the neural network architecture is trained to remove the distortions resulting from both object movement and movement of an image capturing device.

20. A computer program product comprising a non-transitory computer-readable medium including instructions for causing a computer to:
   receive, at a neural network architecture, a degraded image that includes motion blur, the degraded image comprising a foreground portion and a background portion;
   analyze, using a human-aware attention model associated with the neural network architecture, the degraded image to generate one or more human-aware attention masks;
   generate, using an encoder associated with the neural network architecture, an encoded representation of the degraded image;
   generate, using the encoded representation and the one or more human-aware attention masks, foreground feature information and background feature information corresponding to the degraded image;
   receive, at a multi-branch decoder of the neural network architecture, the foreground feature information and the background feature information;
   separately perform, with the multi-branch decoder of the neural network architecture, deblurring functions on the foreground portion and the background portion of the degraded image using the foreground feature information and the background feature information; and
   reconstruct an enhanced image corresponding to the degraded image.

* * * * *